United States Patent [19]

Kato et al.

[11] Patent Number: 5,131,498
[45] Date of Patent: Jul. 21, 1992

[54] LUBRICATING DEVICE OF AUTOMATIC TRANSMISSION

[75] Inventors: Naoji Kato; Masaaki Nishida, both of Anjo; Yoichi Hayakawa, Toyoake, all of Japan

[73] Assignee: Aisin AW Co., Ltd., Japan

[21] Appl. No.: 612,700

[22] Filed: Nov. 15, 1990

[30] Foreign Application Priority Data

Nov. 15, 1989 [JP] Japan ................. 1-297165

[51] Int. Cl.$^5$ ............................. F01M 1/00
[52] U.S. Cl. .......................... 184/6.12; 184/7.4; 74/467; 475/159; 384/466; 384/468
[58] Field of Search .......... 184/6.12, 7.4; 74/467; 475/159; 464/7; 384/466, 468

[56] References Cited

U.S. PATENT DOCUMENTS

| | | | |
|---|---|---|---|
| 2,911,267 | 11/1959 | Small, Jr. | 384/466 |
| 2,935,363 | 5/1960 | Schindel | 384/468 |
| 3,126,980 | 3/1964 | Barnes et al. | 184/6.12 |
| 3,326,423 | 6/1967 | Clark | 184/6 |
| 4,825,726 | 5/1989 | Schofield | 475/159 |
| 4,932,501 | 6/1990 | Decker | 464/7 |
| 5,033,585 | 7/1991 | Mangas | 184/6.12 |

FOREIGN PATENT DOCUMENTS 0037361 2/1984 Japan .................. 475/159

Primary Examiner—Ira S. Lazaras
Assistant Examiner—Alan B. Cariaso
Attorney, Agent, or Firm—Lorusso & Loud

[57] ABSTRACT

An automatic transmission has a rotational shaft with an axial through-hole. The shaft is supported by a case through bearings at opposite ends thereof. In the hole, a cup-type plug with holes is engaged with the shaft at one end thereof. A lubricating means is disposed in the case facing the holes for distributing a lubricating hydraulic fluid to bearings disposed at each end of the shaft.

7 Claims, 5 Drawing Sheets

Fig. 4

| | | Clutch | | | | Brake | | O.W.C | | Gear ratio |
|---|---|---|---|---|---|---|---|---|---|---|
| | | C0 | C1 | C2 | C3 | B1 | B2 | F0 | F1 | |
| P | | × | × | × | × | × | × | × | × | |
| R | V≤7 | × | × | ○ | × | × | ○ | × | × | 2.769 |
| | V>7 | × | × | ○ | × | × | × | × | × | |
| N | | × | × | × | × | × | × | × | × | |
| D | 1ST | × | ○ | × | × | × | × | ○ | ○ | 2.807 |
| | 2ND | × | ○ | × | × | ○ | × | ○ | × | 1.479 |
| | 3RD | ○ | ○ | × | ○ | ◎ | × | ○ | × | 1.000 |
| | 4TH | ○ | ○ | × | × | ○ | × | × | × | 0.735 |
| 2 | 1ST | × | ○ | × | ○ | × | × | ○ | ○ | |
| | 2ND | × | ○ | × | ○ | ○ | × | ○ | × | |
| | 3RD | ○ | ○ | × | ○ | ◎ | × | ○ | × | |
| | (3RD) | ○ | ○ | × | ○ | ◎ | × | ○ | × | |
| 1 | 1ST | × | ○ | × | ○ | × | ○ | ○ | ○ | |
| | 2ND | × | ○ | × | ○ | ○ | × | ○ | × | |
| | (2ND) | × | ○ | × | ○ | ○ | × | ○ | × | |
| | (1ST) | × | ○ | × | ○ | × | ○ | ○ | ○ | |

| Remarks | ○ | Engage | Lock |
|---|---|---|---|
| | × | Disengage | Free |
| | ◎ | B-1 brake is disengaged by B-1 release pressure | |

5,131,498

LUBRICATING DEVICE OF AUTOMATIC TRANSMISSION

FIELD OF THE INVENTION

The present invention relates to a lubricating device of an automatic transmission and, in particular, relates to a lubricating mechanism for a bearing supporting a rotational shaft.

As shown in FIG. 5, a counter driven gear 153 and a differential drive gear 155 are mounted on a counter shaft 154 in a reduction gear mechanism 151 of an automatic transmission. As the result, an input driving force is transmitted to a differential mechanism from a planetary gear set (not shown in any figures).

This rotational shaft, that is a counter shaft 154, is rotatably supported by a transmission case 117b and a converter housing 117c through bearings.

But, the supporting portion of a counter shaft 154, as shown in FIG. 5, is not lubricated except for lubrication in accordance with the rotation of a counter driven gear 153 and a differential drive gear 155.

The supporting portion, therefore, is not sufficiently lubricated so as to maintain a balance of supplying a lubricating hydraulic fluid to bearings 201, 202 located at opposite ends of a counter shaft.

Accordingly, it is very difficult to rotate a counter shaft 154 smoothly and use a roller bearings which are used as the supporting portion and rotating members.

SUMMARY OF THE INVENTION

The present invention has for its object to provide a simple lubricating device for an automatic transmission in order to balance the lubrication of the supporting structure for the rotational shaft.

To establish the above mentioned object, a lubricating device of an automatic transmission comprises a rotational means of the automatic transmission having a hollow rotational shaft with an axial through hole a supporting means for rotatably supporting the rotational means, a bearing means for supporting the rotational shaft, a plug means with an opening portion disposed in the through hole, and a lubricating means for supplying a hydraulic fluid through the hole to lubricate the bearing means, disposed at one end of the rotational shaft.

BRIEF DESCRIPTION OF THE DRAWINGS

FIG. 4 is an operation diagram of the gear train; and

DETAILED DESCRIPTION OF THE PREFERRED EMBODIMENTS

Exemplary embodiments of an automatic transmission according to the present invention will hereinafter be described with reference to the accompanying drawings.

Figure 1A:
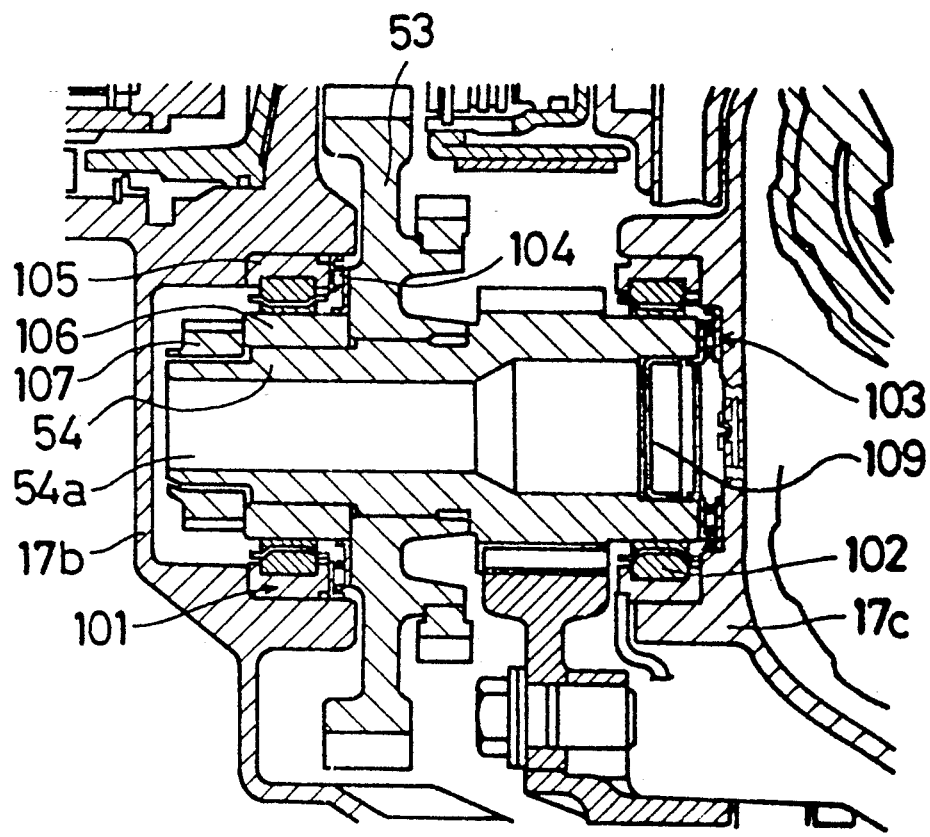
FIG. 1(a) is a sectional view of a rotational shaft bearing structure according to the present invention.
Figure 1B:
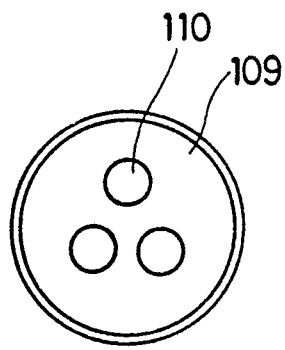
FIG. 1(b) is a plan view of cup 119 of FIG. 1(a)
Figure 1C:
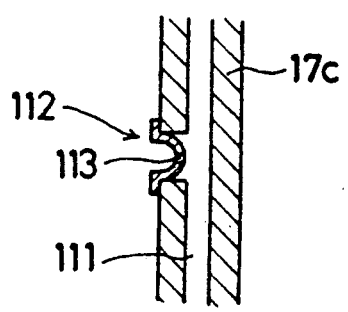
FIG. 1(c) is an exploded partial view of FIG. 1(a) showing the nozzle structure.
Figure 2:
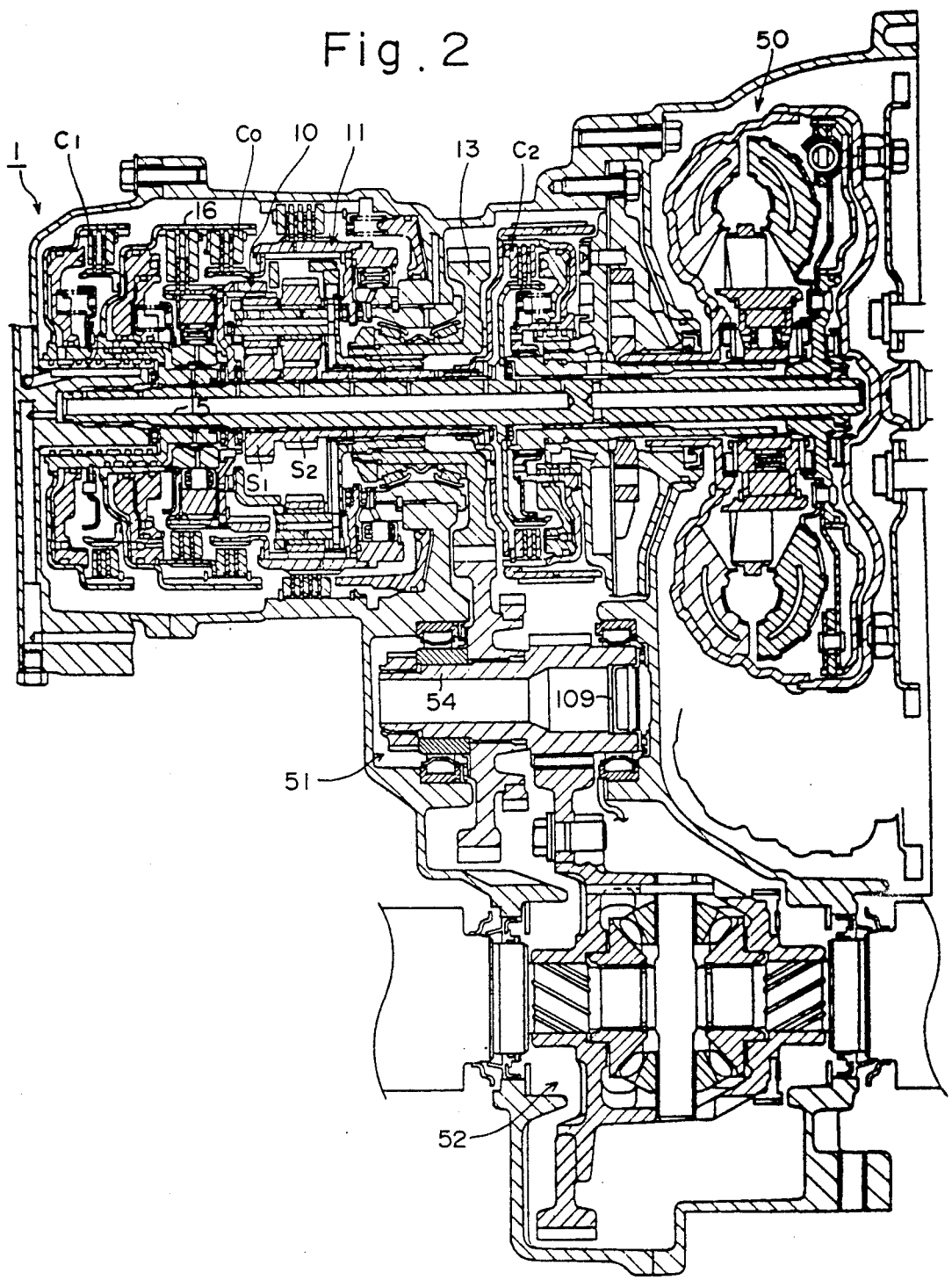
FIG. 2 is a sectional view of an automatic transmission according to the present invention.
Figure 3:
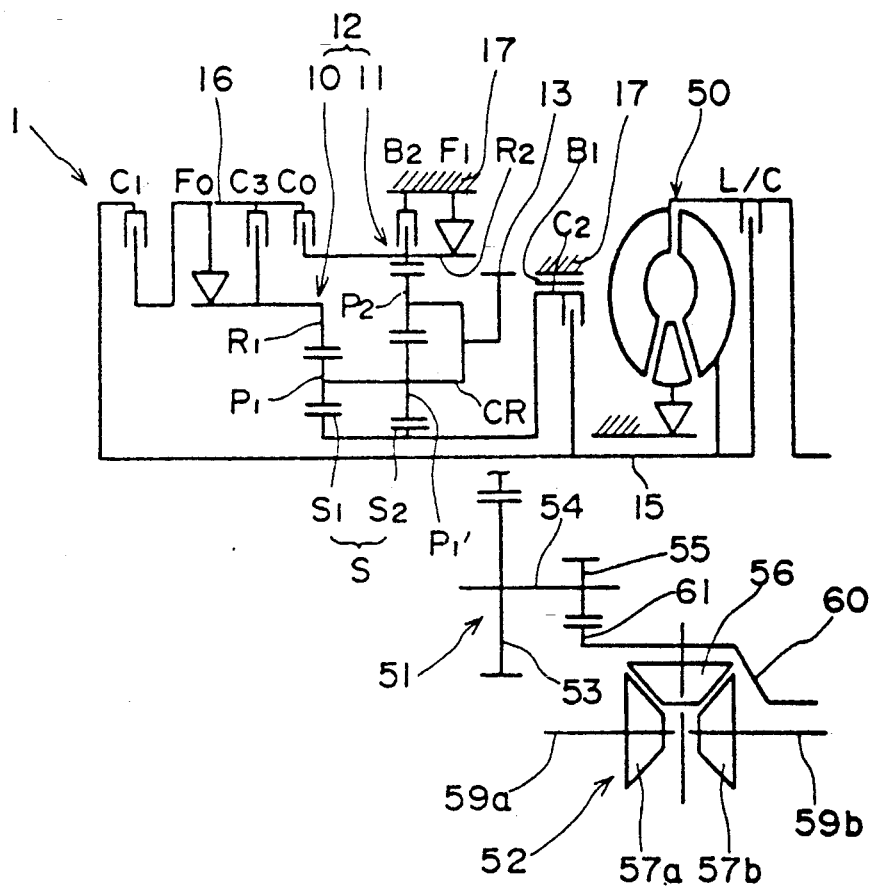
FIG. 3 is a schematic diagram of a gear train of the automatic transmission according to the present invention.
Figure 5:
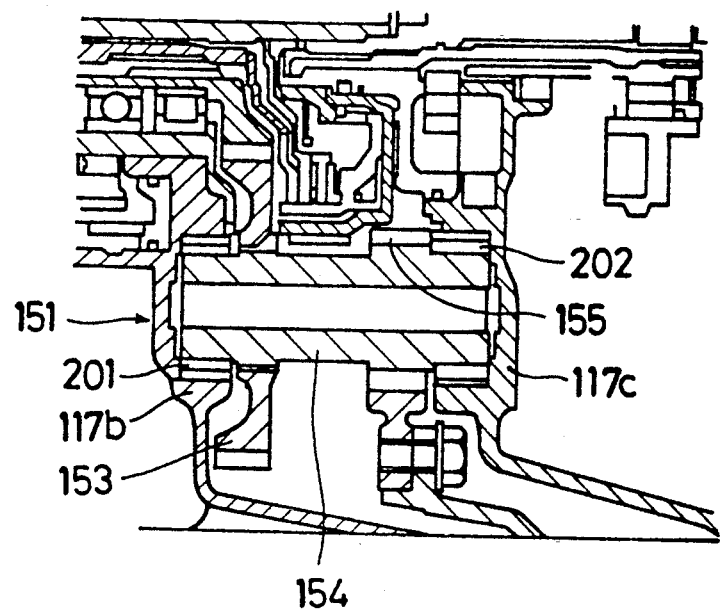
FIG. 5 is a sectional view of a prior art shaft and bearing structure.

FIG. 1 is a sectional view of a rotational shaft bearing structure according to the present invention: FIG. 2 is a sectional view of an automatic transmission according to the present invention: and FIG. 3 is a schematic diagram of a gear train of the automatic transmission according to the present invention.

An automatic transmission 1 has a torque converter 50 with a lock-up clutch device, 4-speed gear transmission 1, a reduction gear mechanism 51, and a differential device 52. 4-speed gear transmission 1 has a planetary gear unit 12 with a single planetary gear set 10 and a dual planetary gear set 11. Sun gears S1, S2 of the planetary gear unit 12 are integrated and composed of an integrated gear S with same number of teeth. Furthermore, pinions P1, P1' are integrated and composed of one long pinion, for example, and a carrier CR, supporting a pinion P2 geared with ring gear R2 (hereinafter "large ring gear") and the pinions P1, P2 are integrated.

An input shaft 15, which extends from an output member of a torque converter 50 is connected with a connecting member 16 through a clutch 16 and connected to a sun gear S through a second clutch C2. A third clutch C3 and a second one way clutch F0 are disposed between a connecting member 16 and a ring gear R1 of a single planetary gear 10 (hereinafter "small ring gear").

A fourth clutch C0 is disposed between the connecting member 16 and the large ring gear R2.

A sun gear S is connected to a first brake B1 in the form of a band brake.

A second brake B2 and a first one way clutch F1 are disposed between large ring gear R2 and a case 17.

A carrier CR is connected to an output gear 13 located in the center of an automatic transmission.

A reduction gear mechanism 51 has a counter shaft 54 rotatably supported by case 17.

A large gear 53 and a small gear 55, which are meshed with the output gear 13, are mounted on the shaft 54.

A differential device 52 has a differential pinion 56 and left and right side pinions 57a, 57b which are connected to left and right front axles 59a, 59b.

A differential pinion 56 is supported by a differential carrier 60 which is rotatably supported by case 17.

A ring gear 61 meshed with the small gear 55 is disposed in the differential carrier 60.

First brake B1, though it is not shown in any figures, has a band fixed to the case at one end thereof.

The band is disposed around a drum connected to sun gear S and the piston rod of hydraulic servo of a brake B1.

FIG. 4 shows an operation diagram of the gear train.

When a manual valve is shifted to D range position, a shift gear stage is first set to the first speed stage. A line pressure is supplied to a first hydraulic servo of a first clutch C1 through a manual valve without supplying any other hydraulic servos.

The first clutch C1 is engaged and first and second one way clutches F1, F0 are engaged in order to establish first speed stage. The rotation of an input shaft 15 is transmitted to a small ring gear R1 through a first clutch C1 and a second one way clutch F0. Since a first one way clutch F1 prevents a large ring gear from rotating, the rotational speed of a carrier CR is much reduced by racing a sun gear S and a drum connected thereto and the reduced rotation is transmitted to output gear 13.

The rotational speed of the gear 13 is reduced by a reduction gear set 51, and the rotation of the gear 13 is transmitted to the left and right axle shafts 59a, 59b through a differential device 52.

Secondly, the second speed stage is established. Besides, the engagement of first clutch C1, first brake B1 is engaged and second one way clutch F0 is engaged in order to establish second speed stage.

The rotation of an input shaft 15 is transmitted to a small ring gear R1 through first clutch C1 and second one way clutch F0. Since first brake B1 prevents sun gear S from rotating, the rotation of the small ring gear R1 is transmitted to carrier CR by racing large ring gear R2.

When 1-2 shift change is stablished, the first one way clutch F1 prevents an automatic transmission from shift shock by having an one way clutch F1 over-running.

The third speed stage is established by engagement of first clutch C1, a third clutch C3, and a fourth clutch C0 with disengagement of first brake B1.

The rotation of an input shaft 15 is transmitted to small ring gear R1 through second one way clutch F0, and a third clutch C3 and to large ring gear R2 through fourth clutch C0. As the result, rotation of input shaft 15 is transmitted to output gear 13 through carrier CR by rotating planetary gear unit 12 in the state of a direct coupling.

The fourth speed stage is established by engagement of first clutch C1, fourth clutch C0 and first brake B1, with third clutch C3 becoming disengaged.

The rotation of input shaft 15 is transmitted to large ring gear R2 through fourth clutch C0.

Since first brake B1 prevents sun gear S from rotating, the rotation of large ring gear R2 is transmitted to output gear 13 through carrier CR by racing ring gear R1. At that time, third clutch C3 is changed to the state of disengagement from engagement in accordance with the engagement of first brake B1.

Even if the third clutch C3 is disengaged earlier, the three speed stage is kept by second one way clutch F0. Shift shock is prevented by delaying engagement of first brake B1.

When the manual valve is shifted to R range position, a shift stage is set to reverse speed stage.

When vehicle speed is lower than a predetermined value, for example 7 km/H, that is substantially halted, second clutch C2 and second brake B2 are engaged.

The rotation of input shaft 15 is transmitted to sun gear S through second clutch C2.

Since second brake B2 prevents large ring gear R2 from rotating, the rotation of the sun gear S is transmitted to the carrier CR as a reverse rotation by racing small ring gear R1 in reverse rotation.

As the result, the reverse rotation is transmitted to output gear 13.

When vehicle speed is higher than a predetermined value, for example 7 km/H, that is the state of slow running, a second brake B2 is not engaged because no hydraulic fluid is supplied to the servo of brake B1.

As a result, the reverse speed stage is not established.

When the manual valve is shifted to a third range position, fourth speed stage is not established.

When the manual valve is shifted to a second range position, input shaft 15 is connected to small ring gear R1 through third clutch C3 in order to maintain engine braking without having a vehicle running slowly by second one way clutch F0 overrun during coasting.

When the manual valve is shifted to first range, third and fourth speed stages are not established.

The explanation of the feature of the present invention is described as following:

FIG. 1 shows the detail of the reduction gear mechanism 51. As show in FIG. 1, a counter shaft 54 with a hole 54a is rotatably supported by a transmission case 17b and a converter housing 17c through roller bearings 101, 102.

Counter shaft 54 is axially supported through a thrust bearing 103 disposed between a converter housing 17c at one end and a thrust bearing 104 disposed between an outer race 105 supported by the transmission case and a counter driven gear at the other end. A locking nut 107 is located at the end of a counter shaft 54 for determining the location of the shaft 54 through an inner race 106.

A cup-type plug 109 is engaged in a hole 54a of a counter shaft 54, as shown in FIG. 1 (b), which is formed in the converter housing 17c.

A steel cup-type plug 109 has a cylinder member with through-holes 110 at the bottom thereof formed equidistant from the center of axis.

A converter housing 17c has a portion facing to the holes 110, where the end of a hydraulic fluid passage 111 is provided with a lubricating means 112 having a jetting nozzle 113.

The jetting nozzle 113 is engaged with the counter housing 17c.

The lubricating operation of the supporting portion, that is bearings, is described as following;

An operating hydraulic fluid is jetted to the through-holes 110 of cup type plug 109 disposed at one end of counter shaft 54 from a jetting nozzle 113 formed in a converter housing 17c. A jetted lubricating hydraulic fluid is, therefore, partially supplied to a roller bearing 101 and a thrust bearing 104 at the opposite end of the shaft 54 through the holes 110 for lubricating them.

A jetted lubricating hydraulic fluid is partially interceped by the bottom of cup-type plug 109 and onto to bearing 103 in order to lubricate thrust bearing 103 and roller bearing 102. According to the present invention, therefore, a rotating member and a roller bearing are lubricated without resort to a complex construction in a lubricating device.

When the area of the through-holes formed at the same distance from the center of axis is same as that of non-through portion of a cup-type plug 109, the amount of lubricating hydraulic fluid supplied through the holes 110 is equal to that not so supplied.

Bearings disposed at the opposite ends of a counter shaft 54 receive a distribution of a lubricating hydraulic fluid which may be balanced by changing the number and the size of the holes.

Though a hydraulic fluid passage is shown disposed in converter housing 17c, it may be disposed in transmission case 17b.

The cup-type plug 109 may be disposed in the hole 54a at the end of counter shaft 54 facing the lubricating jet nozzle, if the passage is disposed in the transmission case.

Though the present invention is shown exemplified by a lubricating device for a rotating member applied to a counter shaft portion of an automatic transmission, the present invention may be used effectively as a lubricating structure for any supporting structures located at opposite ends of a short shaft.

We claim:

1. A lubricating system for lubricating first and second bearing sets located at opposite ends of and rotatably supporting a hollow shaft in an automotive automatic transmission casing, said lubricating system comprising:

a spray nozzle for spraying a lubricating fluid in an axial direction into an adjacent end of the shaft and through the hollow interior of the shaft, whereby lubricating fluid exits the end of the hollow shaft opposite said adjacent end for lubricating the second bearing set;

fluid distribution means for intercepting a first portion of the sprayed lubricating fluid to prevent said first portion of the spray from entering said adjacent end and to redirect said first portion of the spray to lubricate said first bearing set, said fluid distribution means allowing a second portion of the sprayed lubricating fluid to pass through the hollow interior of the shaft and to exit said opposite end of said hollow shaft for lubricating the second bearing set; and fluid guide means, adjacent said opposite end, for directing said second portion of lubricating fluid exiting said opposite end onto said second bearing, said fluid guide means comprising a radially extending fluid flow passage into which said opposite end extends and an annular fluid flow passage, concentric with the hollow shaft, for directing lubricating fluid received from said radially extending fluid flow passage onto said second bearing set.

2. The lubricating system of claim 1 wherein said fluid distribution means is a closure covering said adjacent end of said hollow shaft, and having at least one opening for permitting passage of said second portion.

3. The lubricating system of claim 2 wherein said closure is a cup-shaped plug inserted into said adjacent end.

4. The lubricating system of claim 2 wherein said one opening is off-center with respect to the axis of said hollow shaft.

5. The lubricating system of claim 4 wherein said closure has a plurality of openings equidistant from the axis of said hollow shaft.

6. A lubricating system for bearings rotatably supporting a hollow shaft in an automotive automatic transmission wherein first and second bearing means are located at opposite ends of the hollow shaft, said lubricating system comprising:

a spray nozzle for spraying a lubricating fluid in an axial direction, into a first end of said shaft through the hollow interior of said shaft, whereby the lubricant exits a second end of the hollow shaft opposite said spray means for lubricating said second bearing means;

closure means, covering said first end of said hollow shaft and intercepting a first portion of the sprayed lubricating fluid, whereby said first bearing means is lubricated by said first portion of lubricating fluid, said closure means having a plurality of apertures for allowing a second portion of the sprayed lubricating fluid to pass therethrough in a direction axially of the hollow shaft and to exit said second end of said hollow shaft for lubrication of said second bearing means.

7. A lubricating system in accordance with claim 1 wherein said first and second bearing sets are supported by the transmission casing and wherein said transmission casing and the shaft together define said radially extending fluid flow passage and said annular fluid flow passage.

* * * * *